(12) United States Patent
Belkin et al.

(10) Patent No.: US 6,738,087 B2
(45) Date of Patent: May 18, 2004

(54) METHOD AND SYSTEM FOR TRANSFERRING LIVE VIDEO PICTURES FROM A VIDEO CAMERA TO A REMOTE VIDEO DISPLAYER VIA A CONVENTIONAL TELEPHONE LINE

(75) Inventors: Shahar Belkin, D.N. Negev (IL); Zev Ovnat, Shderot (IL); Dan Groswirth, Shderot (IL); Orly Shdema, Hof Ashkelon (IL)

(73) Assignee: Oz Vision Ltd., D.N. Negev (IL)

( * ) Notice: Subject to any disclaimer, the term of this patent is extended or adjusted under 35 U.S.C. 154(b) by 0 days.

(21) Appl. No.: 10/220,850

(22) PCT Filed: Mar. 9, 2002

(86) PCT No.: PCT/IL00/00141

§ 371 (c)(1),
(2), (4) Date: Nov. 22, 2002

(87) PCT Pub. No.: WO01/67769

PCT Pub. Date: Sep. 13, 2001

(65) Prior Publication Data

US 2003/0169331 A1 Sep. 11, 2003

(51) Int. Cl.⁷ .................................................. H04N 7/12
(52) U.S. Cl. ............................... 348/14.13; 348/384.1; 348/420.1; 375/240.24; 358/426.02
(58) Field of Search ........................... 348/14.01, 14.12, 348/14.13, 384.1, 420.1, 143; 358/426.01, 426.02; 709/228; 375/240.24; 379/93.08, 93.17

(56) References Cited

U.S. PATENT DOCUMENTS

| 4,953,196 A | | 8/1990 | Ishikawa et al. |
| 5,426,513 A | * | 6/1995 | Scorse et al. .......... 358/426.02 |
| 5,821,987 A | | 10/1998 | Larson |
| 2002/0120753 A1 | * | 8/2002 | Levanon et al. ............ 709/228 |

FOREIGN PATENT DOCUMENTS

| EP | 0 588 653 | 3/1994 |
| GB | 2 288 511 | 10/1995 |

OTHER PUBLICATIONS

Patent Abstract of Japan, vol. 2000, No. 01, Jan. 31, 2000 & Japanese Application No. 11 289542, Oct. 19, 1999.

* cited by examiner

*Primary Examiner*—Wing Fu Chan
(74) *Attorney, Agent, or Firm*—Lowe Hauptman Gilman & Berner LLP

(57) ABSTRACT

A method for transferring live video signals from a video camera of a local system to a remote video-display system via low-bandwidth communication lines is disclosed. The method is especially useful for a fixed camera located at a predetermined location, such as a security camera, for monitoring a picture of a substantially constant background. A live video system for implementation of the method is also disclosed that includes a video camera and a video displayer interconnected by a conventional telephone line.

11 Claims, 1 Drawing Sheet

Figure 1:
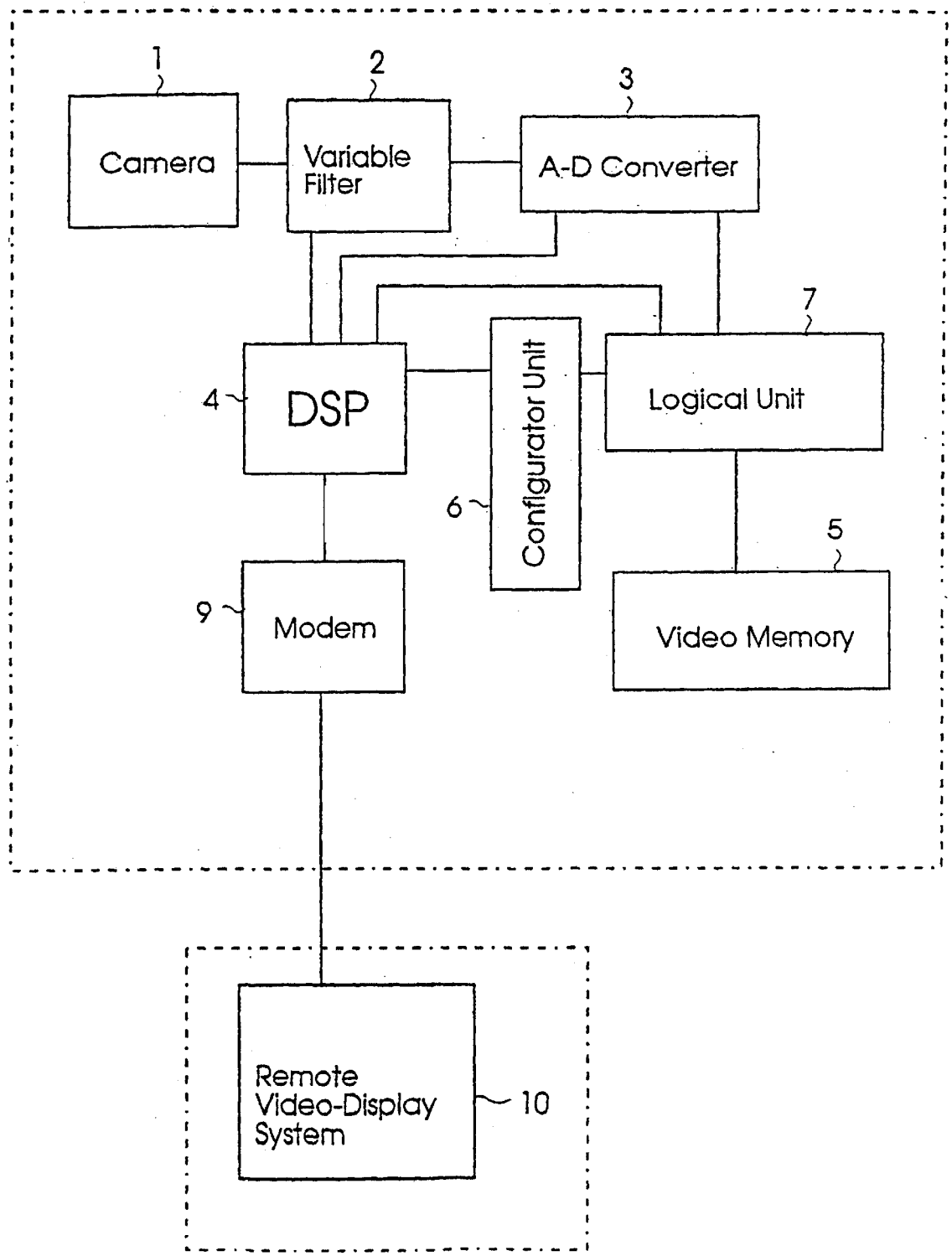

METHOD AND SYSTEM FOR TRANSFERRING LIVE VIDEO PICTURES FROM A VIDEO CAMERA TO A REMOTE VIDEO DISPLAYER VIA A CONVENTIONAL TELEPHONE LINE

FIELD OF THE INVENTION

The present invention generally relates to the field of compression and de-compression of video data transferred via lines having narrow band-width (such as conventional telephone lines). More specifically the present invention relates to a method for transferring live video signals from a video camera to a remote video-displayer, through a conventional telephone line, wherein the said method is especially useful for a fixed camera located at a predetermined location (such as security camera) for monitoring a constant zone, thus having a substantially constant picture background.

The present invention further relates to a system operating by the said method, including a video camera and a video displayer for an interconnection via a conventional telephone line.

BACKGROUND OF THE INVENTION

In most areas of technology, there is a conflict between well developed technologies (which provide new qualities) and the existing out-of-date infrastructure. The old existing infrastructures delay (or inhibit) the implementation of new technologies since new technologies often require infra-structures of advanced qualities.

Many years ago, when telephone systems were just developed, nobody could predict that the same infrastructure of wiring and relay equipment will be utilized for transferring the surprising volume of electronic data as in these days (data which most of it has nothing with the original "telephone" idea).

The voice-wave vibration range for human ear is between twenty and twenty-thousands Hertz. Accordingly, the required bandwidth of a telephone line is twenty kilohertz. Thus, most of the existing telephone infrastructures cannot be relied for transferring a wider bandwidth data.

However, since a telephone line is commonly the most available connection between two remote locations, efforts are constantly made for adapting wide-bandwidth communication systems to communicate through telephone lines. One example for such a system is a video communication system. The constantly decreased prices of electronic equipment can make video communication systems become very popular, provided that a conventional telephone line will satisfy the wiring requirement between the communicate remote locations. Therefore, many video communication systems using conventional telephone line were developed, all try to prevail the disparity between the video bandwidth requirements and the conventional telephone line bandwidth.

For example, a modest non-colored video picture having a resolution of 354×288 pixels each having 256 gray tone possibilities, may require a max. bandwidth of 20,340,400 hertz for transferring pictures in a rate of 25 Hz. This rate is as 1,000 times much as a conventional telephone line may provide. Usually the solution for this problem is a combination of three different things; (a) data compression; (b) reducing the rate of picture per second; and (c) reducing the picture resolution. A video picture having the same resolution mentioned above, may be transferred via a telephone line in a rate of ⅓ Hz (i.e. only one picture every three seconds) after having a 90% data compression. The data compression is effective only on average. Radical changes between successive pictures (i.e. of a fast motion), cause a reduction in the compression possibilities, resulting in daubed pictures.

The present invention comply with the above mentioned problem, and provide a new method (and a system using the method), for transferring video pictures via conventional telephone lines. The said method and system, are especially useful for video pictures taken by stationary video cameras (i.e. security cameras).

SUMMARY OF THE INVENTION

The present invention relates to a method for transferring live video signals from a video camera of a local system to a remote video-display system via low-bandwidth communication lines. The present invention further relates to a system especially useful for transferring live video data through low-bandwidth communication lines according to the method.

The method of the present invention is comprised of;

(a) acquiring the analog data of an initial-picture by a video camera of a local system; digitizing the said analog data into digital values each presents visual information of one definite picture pixel; grouping the pixels' digital values data into a plurality of data-blocks each contains data of one particular picture-region associated to its respective location in the picture by a particular address code wherein each picture-region consists of a few neighboring video-pixels taken from at least four neighboring video rows; storing each data-block in a memory means of the local system and successively transferring it with its address code information to a remote video-display system;

(b) storing the transferred data of the initial-picture in memory means of the remote video-display system and converting the said data to a video-picture displayed on a screen of the video-display system;

(c) acquiring successive video pictures by the video camera, digitizing the analog data of each picture into digital values each presents visual information of one definite picture pixel; grouping the pixels' digital values data into a plurality of data-blocks having the same structure and the same respective addresses as the analogous data-blocks of the initial-picture, subtracting each pixel's value of a successive picture from the analogous pixel's value of the initial picture, summing the pixels subtraction results of each block into a single value representing a significance-weight of the respective block, compressing data of blocks having significance-weight value greater than a predetermined threshold-value and transferring this compressed data followed by the respective block addresses to the remote video-display system;

(d) decompressing the said transferred data received by the remote video-display system and refreshing the relevant picture regions of the displayed video picture according to the newly received data.

According to the present invention, the said threshold-value used in step (c) may be a fixed predetermined value, but preferably it is a dynamic value determined automatically as a function of one of the following (or a combination thereof): A) The previous amount of data-blocks having significance-weight greater than the previous threshold value, thus allow optimizing the picture resolution according to the rhythmus of changes in the picture; B) The actual data transfer capacity of the communication line in use.

According to the present invention the threshold value may be also determined considering a preferred picture-refresh rate electrically pointed-out through the communication line by a user of the remote video-display system. This user's pointing-out may be used directly to determine a threshold value, or according to another variation of the method considerably involved in one of the said A and B options.

Preferably, the step (c) of the method is further comprising the function of compressing and transferring to the remote video-display system data of blocks neighboring to data-blocks having a significance-weight greater than the threshold value (although the neighboring data-blocks themselves have insufficient significance-weight values). The use of this function prevents "disappearing" of small details of the picture such as the extremities of a person in motion (that the picture regions in which they are included may have insufficient significance-weight values). According to one variation of the method of the present invention, this function executed on all the said neighboring data-blocks, without distinction. According to another variation of the method of the present invention, the said function is executed only on those of the said data-blocks having a significance-weight value greater than a lenient secondary threshold value.

According to the method of the present invention, the data compressed and transferred to the remote video-display system is preferably the original digitized picture data (i.e. not the differential data between a current picture and a previous one). In contrast of methods in which a broad picture data is selected to be transferred and the differential data between successive pictures is well compressed, in the method of the present invention the original data of blocks (which significantly differs from the data of respective blocks in the initial picture and thus) selected to be transferred is compressed better. The use of the original data saves calculation resources in both the camera system and the remote video-display system since the only calculation has to be made either for transmitting the video data or for retrieving it is the compression and de-compression calculations.

According to the method of the present invention, preferably each data-block includes the data of a square picture-region holding 64 (8×8) pixels.

The system for transferring live video data through low-bandwidth communication lines according to the present invention is comprising a video-camera system and a video-display system, wherein the video camera system is comprised of a video camera, a variable micro-processor-controlled low-pass filter, an analog-to-digital video-data converter, a digital signal processor, a logical unit, memory means, a programmable address-manager counter, and a communication buffering unit (Modem), wherein video analog data flows from the camera to the variable low-pass filter, converted by the digital-to-analog converter into successively flowing digital values each presents visual information of one definite picture pixel, and the successive digital values are distributed by an addressing sequence of the programmable address-manager counter to a fixed-interval storage addresses of the memory means, thus performing data-blocks respective to picture regions, and wherein in the said logical unit pixels' visual information digital values of an initial picture are stored in the memory and pixels' visual information digital values of successive pictures are subtracted respectively from those of the initial picture, the subtraction results of each data-block are summed into a significance-weight value, compared with a predetermined threshold-value, and data of blocks having significance-weight value greater than the threshold value is being compressed by the signal processor and transferred followed by respective address codes through the telephone line to the remote video-display system, de-compressed and displayed.

According to another embodiment of the video-camera system, video analog data flows from the camera to the variable low-pass filter, converted by the digital-to-analog converter into successively flowing digital values each presents visual information of one definite picture pixel, and the successive digital values are being stored successively in the memory means, than being collected from a fixed-interval storage addresses of the memory means by an addressing sequence of the programmable address-manager counter, thus reading the data is made in blocks respective to picture regions. The process now proceeds as described in the first mentioned embodiment.

DETAILED DESCRIPTION OF THE INVENTION

The present invention will be further described in detail by FIG. 1. This FIGURE is solely intends to illustrate one preferred embodiment of a system for transferring live video data through narrow band-width lines according to the present invention, and in no manner intends to limit the scope of the invention.

A video camera (1) is transferring a video signal of a picture through a variable low-pass filter (2) to the input of an analog-to-digital (hereinafter called "A-D") converter unit (3). During the operation of the system, frequent changes in the video-picture resolution are needed for adapting the volume of transferred data to the capability of the communication line in use and to the preferences of the system user. The changes in the picture resolution are achieved by changing the sampling-rate of the video signal in the input of the A-D converter unit (3). In order to prevent interference between the sampling-rate and the punctuation of a regular video-signal, the microprocessor unit (4) (hereinafter called also Digital Signal Processor -DSP) controls the low-pass filter (2) for smoothing the punctuation in the incoming video signal. Thus, digital values appear successively in the output of the A-D converter unit (3) wherein each digital value represents the color of a single pixel of the picture. In order to define data-blocks associated to respective predetermined picture regions, the said digital values are being loaded to a video memory (5) in a unique way by means of a programmable address-manager counter of the logical unit (7). The programmable address-manager counter programmed by a configurator unit (6), can work either; (a) in the input of the memory for storing the digital video data in blocks according to picture regions; or (b) (according to another system variation) in the output of the memory, for reading data loaded to successive memory addresses in blocks according to picture regions. The aim of this programmable address-manager counter is to distribute the video digital values to storage addresses in the video memory (or, according to said system variation, to read the said values) not according to their series arrival from the video camera but according to their picture region belonging. According to the preferred embodiment of the present invention each data-block (and its respective picture region) holds a data of 64 pixels arranged in an 8×8 pattern. Thus, the address-manager counter first counts from 1 to 8 for referring and storing to the first 8 addresses of the video-memory the eight visual-information values of the first eight-pixel line of the first 8×8 pixel picture-region, then skips counting from 9 to 64 leaving the addresses 9 to 64 free (for receiving later the rest seven lines of eight pixels each, of the first picture region) and proceed counting from 65 to 72 for storing the first eight-pixel line of the second picture region in the 65 to 72 addresses, skips and leaves the addresses 73 to 128 free (for receiving later the other seven lines of eight pixels each, of the second picture region) and proceeds counting from 129 to 136 for the first line of the third picture region, and so on, until the first video line received from the camera is stored. Then, the digital values of the second video line received from the camera are distributed eight by eight, to the addresses 9 to 16, 73 to 80, 137 to 144, and so on, until the whole 8×8 picture-regions are stored each in successive 64 storage addresses (i.e. data-block) of the video memory.

The counter is a programmable counter (i.e. programmed by means of a Field Programmable Gate Array (FPGA) technology), adapted by the microprocessor unit to the current picture resolution. For example, in case the resolution is such that each video line received from the camera is sampled 354 times in the input of the A-D converter, 43 8×8 picture-regions are crossed during each line scanning, and thus the counter is adapted to return and start distributing the data of a second video line (etc.) after 42 skips; in case the resolution is decreased and each camera video line is sampled 224 times, the counter is adapted to return and start distributing the data of a second video line after 28 skips.

The first picture of a video on-line transformation (in the context of the present invention: "initial picture") is saved in the video memory as a reference for the following video pictures, and is usually being refreshed after relatively long time intervals (i.e. a few minutes) predetermined by the manufacturer or by the system user. It is also may be refreshed according to a manually operated user command.

After the initial picture is stored in the memory (and simultaneously transferred through the communication line to a display system, as will be further described), the following pictures are stored in a similar manner in another area of the video memory (in this memory area every successive picture replaces the previous one). Now, each of the data-blocks of the initial picture is recalled sequentially from the memory and compared with a respective data-block of each of the successive pictures, for receiving 64 differential values, one value for each pixel. The 64 differential values are being summed into one value (in the context of the present invention called "significance-weight"), and this value is compared with a threshold value. Those data-blocks having a significance-weight value greater than the threshold value, and those data-blocks neighboring to the first ones (and, according to one system variation, greater than a secondary threshold value), are being compressed by the microprocessor unit, stored in a compressed video memory, and transferred to the remote video-display system through the modem unit and the communication line.

The remote video-display system receives the initial picture and displays it, then receives the compressed data-blocks of selected picture-regions (having significance-weight greater than the threshold, or neighboring to such a data-block) of the successive pictures accompanied by their addresses, de-compresses the received data and refreshes the relevant picture regions display.

What is claimed is:

1. Method for transferring live video signals from a video camera of a local system to a remote video-display system via low-bandwidth communication lines, comprising the steps of;

(a) acquiring the analog data of an initial-picture by a video camera of a local system; digitizing the said analog data into digital values each presents visual information of one definite picture pixel; grouping the pixels' digital values data into a plurality of data-blocks each contains data of one particular picture-region associated to its respective location in the picture by a particular address code wherein each picture-region consists of a few neighboring video-pixels taken from at least four neighboring video rows; storing each data-block in a memory means of the local system and successively transferring it with its address code information to a remote video-display system;

(b) storing the transferred data of the initial-picture in memory means of the remote video-display system and converting the said data to a video-picture displayed on a screen of the video-display system;

(c) acquiring successive video pictures by the video camera, digitizing the analog data of each picture into digital values each presents visual information of one definite picture pixel; grouping the pixels' digital values data into a plurality of similar data-blocks having the same structure and the same respective addresses as the analogous data-blocks of the initial-picture, subtracting each pixel's value of a successive picture from the analogous pixel's value of the initial picture, summing the pixels subtraction results of each block into a single value representing the significance-weight of the respective block, compressing data of blocks having significance-weight greater than a predetermined threshold-value and transferring this compressed data followed by the respective block addresses to the remote video-display system;

(d) decompressing the said transferred data received by the remote video-display system and refreshing the relevant picture regions of the displayed video picture according to the newly received data.

2. Method for transferring live video signals according to claim 1, wherein the threshold-value is dynamic and determined automatically relatively to previous amount of transferred data.

3. Method for transferring live video signals according to claim 1, wherein the threshold value is dynamic and determined automatically considering the actual data transfer rate allowed by the communication line in use.

4. Method for transferring live video signals according to claim 1, wherein the threshold value is determined considering a preferred picture-refresh rate electrically pointed-out through the communication line by a user of the remote video-display system.

5. Method for transferring live video signals according to claim 1, wherein data of blocks neighboring to data-blocks having significance-weight greater than the threshold value is also compressed and transferred to the remote video-display system.

6. Method for transferring live video signals according to claim 1, wherein data of blocks neighboring to data-blocks having significance-weight greater than the threshold value is also compressed and transferred to the remote video-display system, conditionally to having a significance-weight value greater than a lenient secondary threshold value.

7. Method for transferring live video signals according to claim 1, wherein the data compressed and transferred to the remote video-display system is the original digitized picture data.

8. Method for transferring live video signals according to claim 1, wherein each data-block include data of a square picture region holding 64 pixels.

9. Live-video system especially useful for transferring live video data through low-bandwidth communication lines according to the method defined in claim 1, comprising a video-camera system and a video-display system, wherein the video camera system is comprised of a video camera, a variable micro-processor-controlled low-pass filter, an analog-to-digital video-data converter, a digital signal processor, a logical unit, memory means, a programmable address-manager counter, and a communication buffering unit, wherein video analog data flows from the camera to the variable low-pass filter, converted by the digital-to-analog converter into successively flowing digital values each presents visual information of one definite picture pixel, and the successive digital values are distributed by an addressing sequence of the programmable address-manager counter to a fixed-interval storage addresses of the memory means, thus performing data-blocks respective to picture regions, and wherein in the said logical unit pixels' visual information digital values of an initial picture stored in the memory and pixels' visual information digital values of successive pictures are subtracted respectively from each other, the subtraction results of each data-block are summed into a significance-weight value, compared with a predetermined threshold-value, and data of blocks having significance-weight value greater than the threshold value is being compressed by the signal processor and transferred followed by respective address codes through the telephone line to the remote video-display system, de-compressed and displayed.

10. Live-video system especially useful for transferring live video data through low-bandwidth communication lines according to the method defined in claim 1, comprising a video-camera system and a video-display system, wherein the video camera system is comprised of a video camera, a variable micro-processor-controlled low-pass filter, an analog-to-digital video-data converter, a digital signal processor, a logical unit, memory means, a programmable address-manager counter, and a communication buffering unit, wherein video analog data flows from the camera to the variable low-pass filter, converted by the digital-to-analog converter into successively flowing digital values each presents visual information of one definite picture pixel, and the successive digital values are being stored successively in the memory means, than being collected from a fixed-interval storage addresses of the memory means by an addressing sequence of the programmable address-manager counter, thus reading the data in blocks respective to picture regions, and wherein in the said logical unit pixels' visual information digital values of an initial picture read-out from the memory-means are subtracted respectively from pixels' visual information digital-values of successive pictures, the subtraction results of each data-block are summed into a significance-weight value, compared with a predetermined threshold-value, and data of blocks having significance-weight value greater than the threshold value is being compressed by the signal processor and transferred followed by respective address codes through the telephone line to the remote video-display system, de-compressed and displayed.

11. Live-video system especially useful for transferring live video data through low-bandwidth communication lines according to claim 9, wherein each data-block includes data of a square picture region holding 64 pixels.

* * * * *